(12) United States Patent
Martin

(10) Patent No.: US 11,507,045 B2
(45) Date of Patent: Nov. 22, 2022

(54) WORK PIECE CONDITION DETECTION USING FLAME ELECTRICAL CHARACTERISTICS IN OXY-FUEL THERMAL PROCESSING EQUIPMENT

(71) Applicant: The ESAB Group Inc., Florence, SC (US)

(72) Inventor: Christopher Reed Martin, Florence, SC (US)

(73) Assignee: THE ESAB GROUP INC., Florence, SC (US)

( * ) Notice: Subject to any disclaimer, the term of this patent is extended or adjusted under 35 U.S.C. 154(b) by 0 days.

(21) Appl. No.: 16/679,460

(22) Filed: Nov. 11, 2019

(65) Prior Publication Data

US 2020/0096964 A1 Mar. 26, 2020

Related U.S. Application Data

(60) Continuation of application No. 16/038,359, filed on Jul. 18, 2018, now Pat. No. 10,514,675, which is a
(Continued)

(51) Int. Cl.
*G05B 19/402* (2006.01)
*B23K 5/00* (2006.01)
(Continued)

(52) U.S. Cl.
CPC .............. *G05B 19/402* (2013.01); *B23K 5/00* (2013.01); *B23K 5/22* (2013.01); *B23K 7/10* (2013.01);
(Continued)

(58) Field of Classification Search
CPC .......... G05F 1/625; G05B 2219/41383; G05B 15/02; G05B 19/402; B23K 5/00; B23K 7/102; B23K 5/22; B23K 7/10
See application file for complete search history.

(56) References Cited

U.S. PATENT DOCUMENTS 2,949,391 A * 8/1960 Anderson ............... B23K 7/102
239/132.3
3,823,928 A * 7/1974 Stolin ..................... B23K 7/102
219/124.02
(Continued)

FOREIGN PATENT DOCUMENTS

DE 249598 A3 9/1987
DE 102009033556 A1 1/2011
(Continued)

OTHER PUBLICATIONS

Communication pursuant to Article 94(3) EPC dated Oct. 12, 2020 for European Patent Application No. 14767439.4, 5 pages.
(Continued)

*Primary Examiner* — Shogo Sasaki
(74) *Attorney, Agent, or Firm* — Edell, Shapiro & Finnan, LLC

(57) ABSTRACT

An automated oxy-fuel thermal processing system including an oxy-fuel torch, an automated machine tool operatively coupled to the torch for moving the torch relative to a work piece, and a circuit including a voltage source or a current electrically connected to the torch and configured to be electrically connected to the work piece. The automated oxy-fuel thermal processing system may further include a processor that is operatively connected to the torch, the automated machine tool, the circuit, and the voltage source or current source, wherein the processor is configured to control the operation of the torch, the automated machine tool and the voltage source or current source, and to monitor a current or voltage in the circuit in a predefined manner.

9 Claims, 10 Drawing Sheets

Related U.S. Application Data division of application No. 14/777,313, filed as application No. PCT/US2014/025938 on Mar. 13, 2014, now Pat. No. 10,067,496.

(60) Provisional application No. 61/786,956, filed on Mar. 15, 2013.

(51) Int. Cl.
  *B23K 7/10* (2006.01)
  *B23K 5/22* (2006.01)
  *G05B 15/02* (2006.01)
  *G05F 1/625* (2006.01)

(52) U.S. Cl.
  CPC .............. *B23K 7/102* (2013.01); *G05B 15/02* (2013.01); *G05F 1/625* (2013.01); *G05B 2219/41383* (2013.01)

(56) References Cited

U.S. PATENT DOCUMENTS

| | | | | |
|---|---|---|---|---|
| 4,170,727 A | * | 10/1979 | Wilkins | B23K 9/0735 219/121.36 |
| 4,328,049 A | | 5/1982 | Richardson | |
| 4,363,468 A | * | 12/1982 | Noe | B23K 7/102 700/192 |
| 4,439,249 A | | 3/1984 | Singh et al. | |
| 4,854,551 A | * | 8/1989 | Griebeler | B23Q 15/24 266/76 |
| 5,470,047 A | | 11/1995 | Shin et al. | |
| 5,989,485 A | * | 11/1999 | Staacks | B23K 10/00 266/76 |
| 6,251,336 B1 | | 6/2001 | Billerot | |
| 9,011,758 B2 | * | 4/2015 | Bissonnette | B23K 7/10 266/48 |
| 2013/0221585 A1 | * | 8/2013 | Bissonnette | F16L 41/00 266/44 |

FOREIGN PATENT DOCUMENTS

| | | |
|---|---|---|
| JP | 07-244018 A | 9/1995 |
| JP | 09-150270 A | 6/1997 |
| KR | 1020120017189 A | 2/2012 |

OTHER PUBLICATIONS

Supplemental European Search Report dated Sep. 20, 2016 for European Patent Application No. 14767439.4.

International Search Report and Written Opinion dated Aug. 18, 2014 for PCT Application, PCT/US2014/025938 filed Mar. 13, 2014.

Communication pursuant to Article 94(3) EPC dated Oct. 30, 2019 for European Patent Application No. 14767439.4, 5 pages.

* cited by examiner

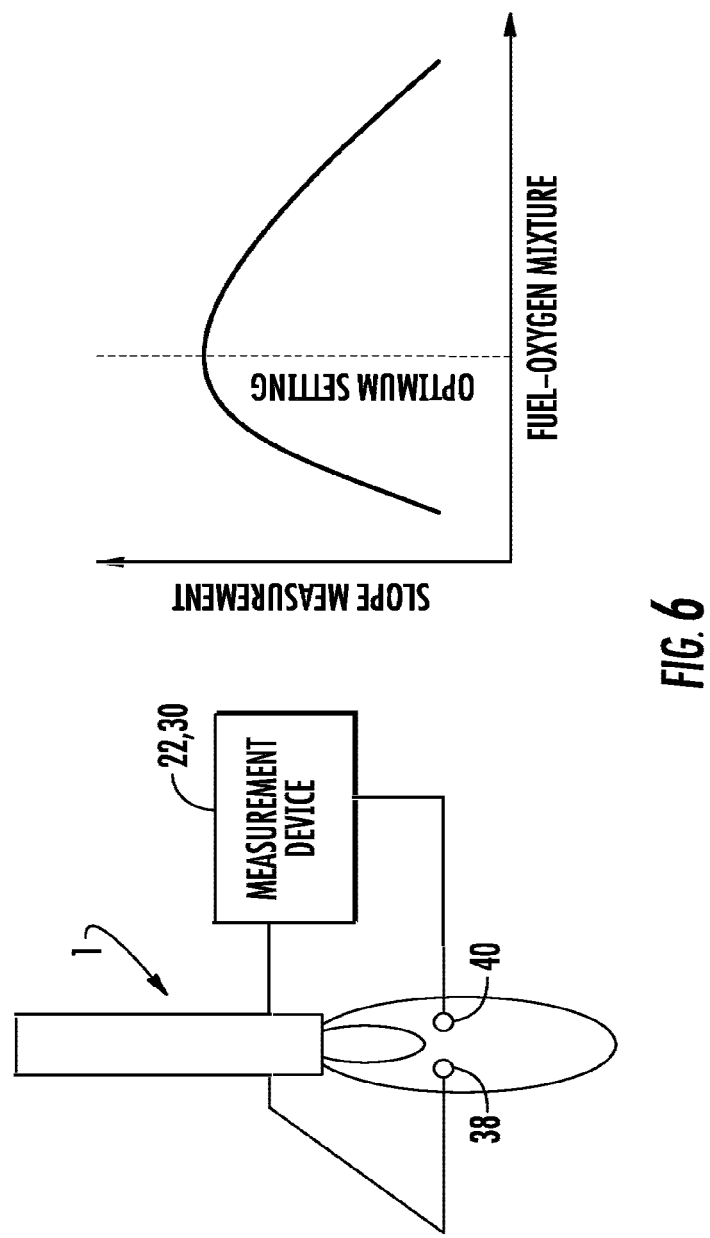

WORK PIECE CONDITION DETECTION USING FLAME ELECTRICAL CHARACTERISTICS IN OXY-FUEL THERMAL PROCESSING EQUIPMENT

CROSS-REFERENCE TO RELATED APPLICATIONS

This application is a continuation application of U.S. patent application Ser. No. 16/038,359 filed Jul. 18, 2018, now U.S. Pat. No. 10,514,675, which is a divisional application of U.S. patent application Ser. No. 14/777,313 filed Sep. 15, 2015, now U.S. Pat. No. 10,067,496, which is a national stage application of International Patent Application No. PCT/US2014/025938 filed Mar. 13, 2014, which claims priority to U.S. provisional patent application Ser. No. 61/786,956, filed Mar. 15, 2013, titled "Work piece Condition Detection using Flame Electrical Characteristics in Gas Cutting Torches," the entirety of all of which is incorporated herein by reference.

FIELD OF THE DISCLOSURE

Embodiments of the present invention relate generally to the field of oxy fuel thermal processing equipment, and more particularly to system that can obtain parameters associated with a thermal cutting or welding process using electrical characteristics of the torch flame an oxy fuel thermal processing equipment.

BACKGROUND OF THE DISCLOSURE

Modern automated gas cutting torches are commonly equipped with features such as automatic ignition, automatic standoff control, kindling temperature detection, ignition and blowout detection, and neutral flame detection. Each of these features can be implemented using actuation and sensing mechanisms that should be reliable, economical, and resistant to the harsh operating environments created when cutting is performed (e.g. high heat, abrasive debris, particulate deposition etc.).

Kindling temperature detection has been successfully achieved using optical infrared (IR) sensors directed toward a work piece. While optical sensors are generally effective for such an application, they are extremely sensitive to abrasion and particulate deposition, and are therefore commonly mounted within a torch and directed down the torch's cutting oxygen orifice. One problem with this approach is that it cannot be implemented in cases where the diameter of a torch's cutting oxygen bore is too small to accommodate an optical sensor.

Automatic ignition in gas cutting torches has been achieved by temporarily re-routing a torch's fuel-oxygen mixture through the torch's cutting bore for a period of time sufficient to allow a flame, ignited internally, to propagate to the tip of the torch, where it is allowed to stabilize. This solution requires solenoids to be operatively mounted within the torch for adjustably routing the fuel-oxygen mixture.

Various techniques for automatic standoff control are known, each of which is associated with particular shortcomings. For example, capacitive standoff control techniques, such as those described in U.S. Pat. No. 6,251,336, rely on the assumption that a work piece (e.g. a steel plate) is a quasi-infinite surface. Such techniques therefore perform inconsistently when a cutting torch nears the edges of a work piece. Inductive standoff control techniques rely on perturbations in an induced, oscillating magnetic field around a work piece, and are therefore susceptible to undesirable cross-interference when two torches are operated near one another. Optical standoff control methods require sensors that must be mounted on the exterior of a torch, and are therefore susceptible to being obscured, scratched or otherwise damaged by debris during cutting. Mechanical standoff control methods that use whiskers or rider plates require large radii in which to operate. Such methods may therefore yield inconsistent results when performed adjacent a work piece's edges or near areas where two cuts meet.

It is apparent that current approaches for implementing certain advantageous features of modern gas cutting torches suffer from various inconsistencies of operation. Moreover, such approaches require additional electronics and hardware to be mounted on or inside of a gas cutting torch, which can substantially increase the cost of an automated torch system while diminishing the reliability of a system. It would therefore be advantageous to provide an automated gas cutting torch system that provides features such as kindling temperature detection, automatic ignition, and automatic standoff control, wherein such system is reliable, economical, and robust.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments of the present disclosure are generally directed to an automated oxy-fuel thermal processing system and a method of operating the same. In some embodiments the system is an oxy-fuel cutting system. In other embodiments the system is an oxy-fuel welding system.

An oxy-fuel thermal processing system is disclosed. The system includes a driver coupled between first and second surfaces for driving a current between the first and second surfaces, the first and second surfaces exposed to a flame of a torch associated with the oxy-fuel processing system. A voltage sensor may be coupled between the first and second surfaces for sensing a voltage response to the driven current. A microprocessor is in communication with the current driver and the voltage sensor for receiving driven current and sensed voltage response information, the microprocessor configured to calculate a first parameter associated with a thermal process based on said received current and voltage response information, to determine if the first parameter is within a predetermined range, and when the first parameter is outside the predetermined range to instruct adjustment of a second parameter associated with the thermal process.

An oxy-fuel thermal processing system is disclosed. The system includes a voltage source coupled between first and second surfaces for applying a voltage between the first and second surfaces, the first and second surfaces exposed to a flame of a torch associated with the oxy-fuel thermal processing system. A current sensor may be coupled between the first and second surfaces for sensing a current response to the applied voltage. A microprocessor is in communication with the voltage source and the current sensor for receiving applied voltage and sensed current response information. The microprocessor may be configured to calculate a first parameter associated with a thermal process based on said applied voltage and sensed current response information, to determine if the first parameter is within a predetermined range, and when the first parameter is outside the predetermined range to instruct adjustment of a second parameter associated with the thermal process.

A method is disclosed for controlling an oxy-fuel thermal processing process, comprising: applying a voltage between first and second surfaces while the first and second surfaces are exposed to a flame of a torch; sensing a current generated in response to the applied voltage; and determining a first parameter associated with a thermal processing process based on the applied voltage and the sensed current; determining whether the first parameter is within a predetermined range, and when the first parameter is outside the predetermined range adjusting a second parameter associated with the thermal processing process.

A method is disclosed for controlling an oxy-fuel thermal processing process, comprising: driving a current between first and second surfaces while the first and second surfaces are exposed to a flame of a torch; sensing a voltage between the first and second surfaces in response to the driven current; and determining a first parameter associated with a thermal process based on said driven current and sensed voltage; determining whether the first parameter is within a predetermined range, and when the first parameter is outside the predetermined range adjusting a second parameter associated with the thermal process.

In some embodiments the disclosed system may include a cutting torch, an automated machine tool operatively coupled to the cutting torch for moving the cutting torch relative to a work piece, and a sensing circuit including a voltage source electrically connected to the torch and configured to be electrically connected to the work piece. The sensing circuit further includes a processor that is in communication with the cutting torch, the automated machine tool, the circuit, and the voltage source. The processor may be configured to control the operation of the cutting torch, the automated machine tool, and the voltage source and to monitor a current in the circuit in a predefined manner.

A method for operating a cutting torch system is also disclosed. In some embodiments the method may include outputting a voltage from a voltage source that is electrically connected in series with a cutting torch and a work piece being cut by the cutting torch, lowering the cutting torch toward the work piece until current flows between a tip of the gas cutting torch and the work piece, indicating that a tip of the cutting torch has reached a zero height at which the tip is in contact with the work piece.

BRIEF DESCRIPTION OF THE DRAWINGS

By way of example, specific embodiments of the disclosed device will now be described, with reference to the accompanying drawings, in which:

FIG. 6 is a schematic illustrating an exemplary technique for measuring an optimum gas mixture for a cutting torch;

DETAILED DESCRIPTION

Figure 1:
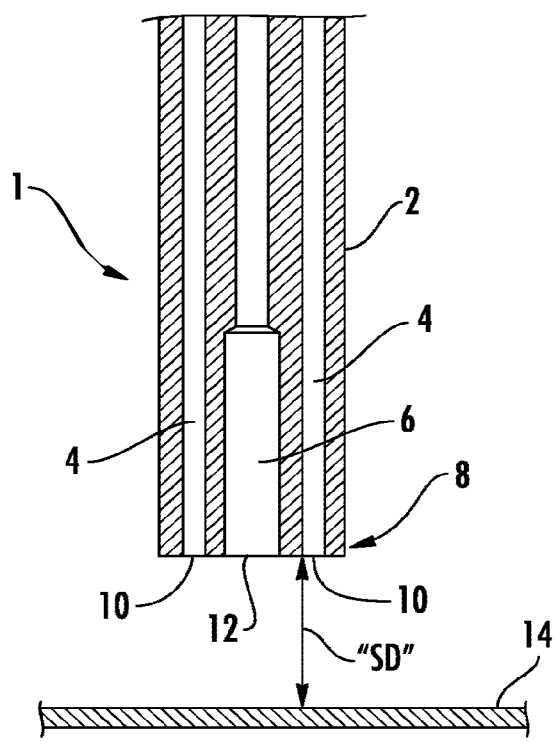
FIG. 1 is a cross-section view of an exemplary oxy-fuel cutting tip.

The present disclosure will now be described more fully hereinafter with reference to the accompanying drawings, in which preferred embodiments of the invention are shown. This disclosure, however, may be embodied in many different forms and should not be construed as limited to the embodiments set forth herein. Rather, these embodiments are provided so that this disclosure will be thorough and complete, and will fully convey the scope of the disclosure to those skilled in the art. In the drawings, like numbers refer to like elements throughout.

The oxy-fuel cutting process is used to cut material that reacts with oxygen by heating the material to a kindling temperature, and then burning the material away in an oxygen-rich atmosphere. To achieve this, as shown in FIG. 1 an oxy-fuel cutting torch 1 can comprise a long cylinder 2 with internal passages 4, 6 configured to deliver gaseous fuel (e.g., acetylene, propane, or the like) and oxygen, respectively, to a nozzle 8, mounted at the cylinder's bottom. The nozzle 8 can issue a premixed combustible mixture from an array of ports 10 arranged around a central port 12 from which pure oxygen is issued.

To begin a cut, the torch 1 is positioned a distance above a work piece 14. The torch 1 may be operating with a stable flame 16 (FIG. 2) oriented downward at the work piece 14. At this point oxygen is not supplied through the central port 12. Rather, the flame 16 may be used to heat the work piece 14 until it is hot enough that the material will burn in an oxygen atmosphere. The critical temperature needed for a cut to successfully begin is referred to as the "kindling temperature." When the work piece 14 reaches its kindling temperature, oxygen is supplied via the central port 12. If the work piece 14 is sufficiently hot, it will ignite and the flow of oxygen will pierce the work piece. If the work piece 14 is too cool, however, the flow of oxygen will only serve to further cool the material and the heating process will have to be repeated before cutting can be performed. As will be appreciated, in order to obtain an efficient process, it is important to accurately determine when the work piece is ready for cutting (i.e., when the material of the work piece has reached its kindling temperature).

Once piercing of the work piece 14 is accomplished, the torch 1 can then be moved along a desired cut path to cut the work piece into a desired shape. Generally speaking, as the flame 16 advances through the work piece, the material in front of the flame is relatively cool, and thus it must be brought up to the kindling temperature in order to enable it to be cut by the flame. The process relies on the preheat flame, but particularly relies on the heat released from the cut itself. As will be appreciated, if the torch 1 is advanced too quickly the heat released from the cut may not have sufficient time to conduct into the surrounding plate, and the temperature of the surface inside the advancing cut will fall. If the temperature drops too low then combustion may stop, and the preheat process will need to be repeated to restart the cut.

There are a number of practical issues that arise when attempting to automate an oxy-fuel cutting process. Before the process is begun, the torch 1 is ignited and the flow of fuel and oxygen brought into desired proportions. The torch 1 is then brought to a predetermined height above the work piece and allowed to bring the material to its kindling temperature. The specific height and the timing of the process can be important to the successful initiation of a cut.

To accomplish these functions, cutting systems often include automated and/or manual adjustment mechanisms for moving the torch 1 in two horizontal axes (x-y) in order to generate a cut path on a work piece such as a flat plate. The adjustment mechanism may also be configured for adjusting the height of the torch 1 relative to the work piece. Such adjustment mechanisms are known in the art, and thus will not be described in detail herein. It will be appreciated that the disclosed system not limited to use with such mechanisms, there are many potential embodiments that include them.

As described, the oxy-fuel cutting process can include a series of operations including a number of steps that rely on feedback, either from a human operator or from an appropriately robust suite of sensors and controls. For example, feedback can be desirable to facilitate adjusting the torch's fuel-oxygen mixture to achieve a desired "neutral flame." During the preheat operation, if sensor feedback indicates the work piece 14 temperature is not determinable (e.g., due to sensor error), the operator must visually observe the glow of the work piece, or an automated system must be programmed to wait for an additional period of time to ensure that the work piece has achieved its kindling temperature so that cutting will successfully start. In another example, a standoff distance "SD" between the torch 1 and the work piece 14 depends on feedback control since the standoff can be on the order of an inch or less, and the torch may be positioned many feet from the operator making visual observation difficult or inconvenient.

While a desired level of feedback can be obtained by mounting sensors on or around the torch, the volatile environment of the oxy-fuel cutting system necessitates sensors that are hardened against electrical noise, thermal stresses, abrasion and impact. As a result such sensors are often either very vulnerable to damage and/or are very expensive.

Figure 2:
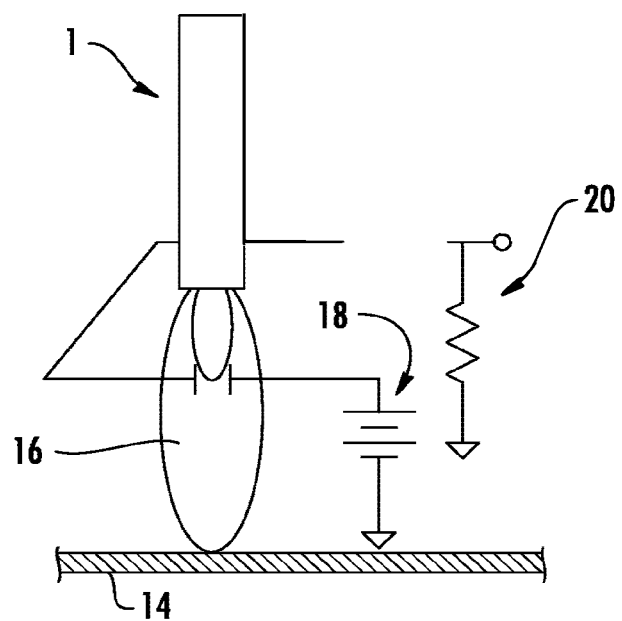
FIG. 2 is a schematic view of an exemplary cutting flame and two surfaces with voltage source and shunt.

In the context of a torch flame 16, an electrical potential applied between two surfaces that are otherwise electrically isolated (e.g., the torch 1 and the work piece 14) will result in a flow of current through the torch flame. This relationship can be measured using an arrangement such as that shown in FIG. 2, illustrating the torch 1, the torch flame 16, a voltage source 18 and a shunt resistor 20. It will be appreciated that the voltage source 18 and shunt resistor 20 are but one possible embodiment, and that other arrangements can also be used. In addition, although the description will proceed in relation to the use of two surfaces under test (e.g., the torch 1 and the work piece 14), other sensing surface configurations can also be used, and thus the disclosure is not so limited.

Figure 3:
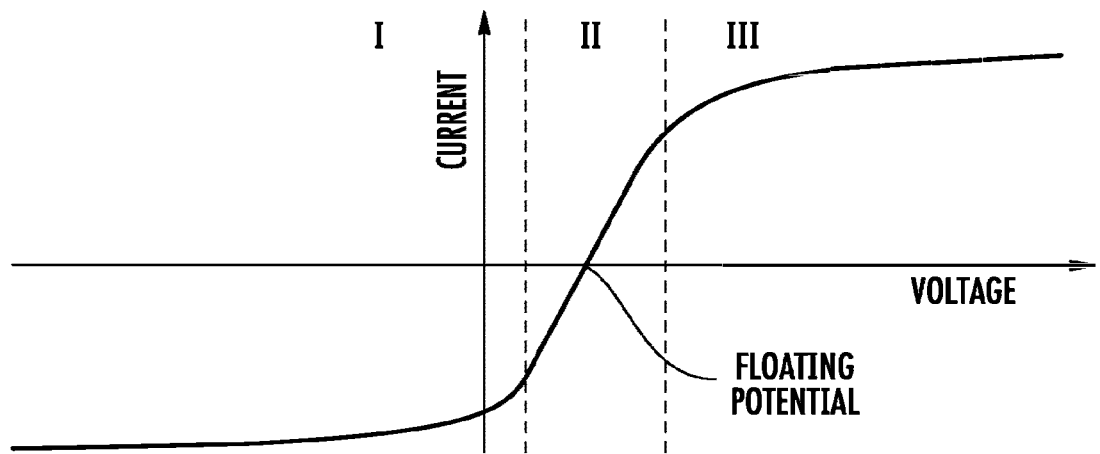
FIG. 3 is a hypothetical current-voltage (I-V) diagram representative of operational behavior of the schematic elements of FIG. 2.

The relationship between voltage and current can be divided into three regimes, shown in FIG. 3. In the central, "linear regime" (II), current through the torch flame is limited by the electrical resistance of the torch flame which separates the two surfaces 1, 14. As such, the slope of the characteristic curve in this linear regime (II) is constant. However, as the magnitude of current through the torch flame 16 approaches either extreme, it eventually enters a "saturation regime" (I, III). In the saturation regime (I, III), current through the torch flame 16 is limited by the cathode (i.e., negative) surface's capacity to emit electrons.

In the linear regime, the characteristic relationship between current and voltage (I-V) can, but need not, pass through the origin. For embodiments in which the two surfaces 1, 14 are made from different materials, or are at different temperatures, they will have a different affinity for electrons. As a result, if the circuit represented by FIG. 3 is opened, charge will accumulate until the surfaces 1, 14 reach a steady-state "floating potential." This "floating potential" is the potential between two surfaces 1, 14 that is necessary to achieve zero current.

The slope in the linear regime (II) is influenced by a number of characteristics including the flame temperature, the gas composition, and especially the distance between the surfaces. The slope of the I-V curve is an implicit measurement of the torch flame's electrical resistance in the path between the two surfaces 1, 14. As the surfaces 1, 14 approach each other (e.g., as the torch nozzle 8 is moved toward the work piece 14), or as the concentration of free radicals increases in the torch flame 16, the resistance of the torch flame drops detectably.

The floating potential, on the other hand, is influenced by the surface materials and temperature. Thus, for a given pair of surfaces 1, 14 if the temperature of one surface is known, then the floating potential can be assumed to be an indicator of the temperature of the other surface.

The disclosed system and method exploits the electrical conductivity of the torch flame 16 to detect parameters important to the cutting process (e.g., torch offset, work piece temperature), while minimizing and/or eliminating the need for physical sensors and/or probes. By imposing an "electrical action," measuring a resulting "electrical response," and interpreting the results, it is possible to extract a great deal of information on the oxy-fuel process.

Figure 4A:
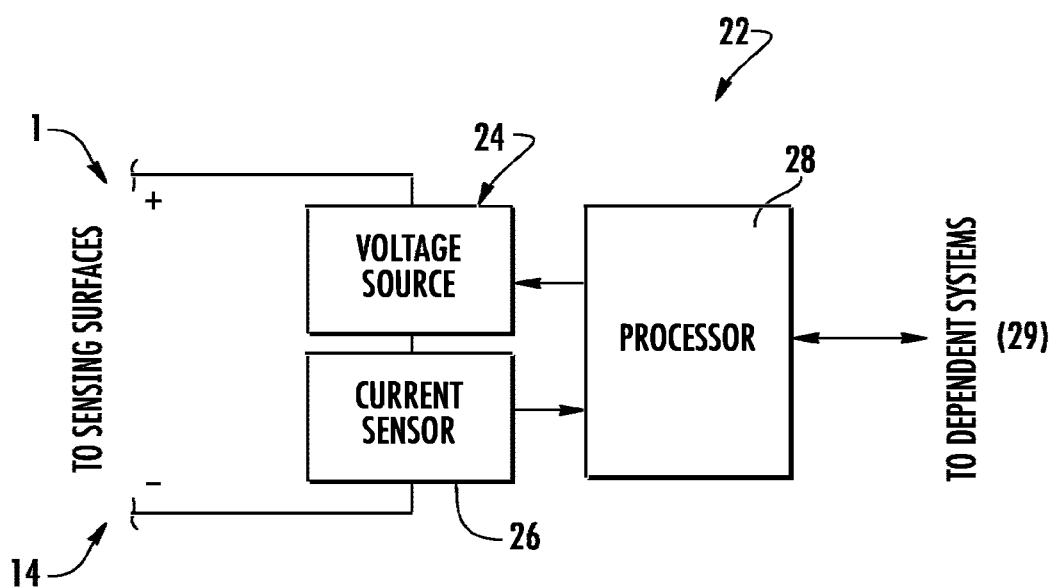
FIG. 4A is a voltage driven sensing system according to an embodiment of the disclosure.
Figure 4B:
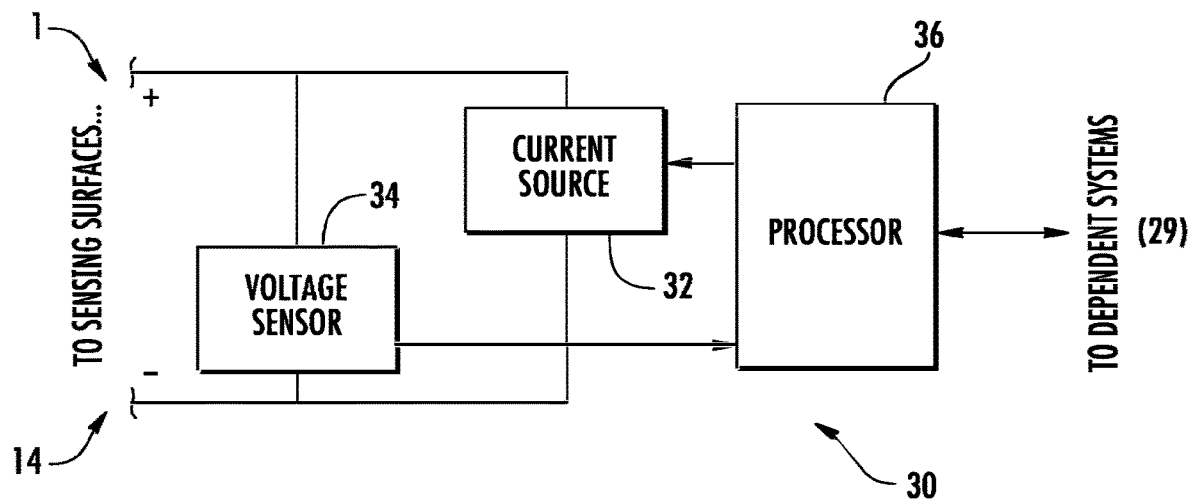
FIG. 4B is a current driven sensing system according to an embodiment of the disclosure.

In some embodiments the electrical action can take the form of either an applied voltage or a driven current, with the resultant measurement being a measured current or measured voltage, respectively. FIG. 4A shows one exemplary non-limiting embodiment of a system 22 in which a voltage source 24 applies the electrical action, a current sensor 26 such as a shunt measures the current response, and a processor 28 collects a series of measurements and computes various parameters. A non-limiting exemplary list of directly measured parameters includes linear slope, floating potential, upper/lower saturation current, upper/lower saturation voltage and upper/lower saturation slope. A non-limiting exemplary list of derived parameters includes standoff distance "SD," standoff error, flame mixture quality, cut speed error, imminent cut loss, successful ignition, and work piece temperature. These parameters may be communicated to one or more dependent systems 29. A non-limiting exemplary listing of such dependent systems 29 includes a torch height controller, motors for positioning the torch vertically with respect to the work piece, motors for moving the torch in the x-y axis with respect to the work piece, a cut speed controller, a gas flow controller, valves regulating the flow of gases, an operator display and a master CNC responsible for control of any or all of the aforementioned systems. FIG. 4B illustrates an alternate embodiment of the disclosed system 30 in which current is driven in lieu of voltage. In this embodiment a current source 32 applies the electrical action, a voltage sensor 34 measures the voltage response, and a processor 36 collects a series of measurements and computes various parameters, which have been previously identified. In both examples, the imposition of an electrical action and measurement of an electrical response is used to interrogate the system's I-V characteristic, as will be described below, to obtain information about the operation of the system.

There are two fundamental measurements that are used to derive most of the measurements offered by the present disclosure: (1) floating potential, and (2) linear slope. Others are also possible, such as saturation threshold current, saturation threshold voltage, and the slope in the saturation regions, but the inventor has found that the linear regime characteristics appear to be the most reliable.

One non-limiting exemplary method for measuring the floating potential is to force the current flow between the surfaces 1, 14 to zero. Once the voltage between the two surfaces 1, 14 stabilizes, it is taken as the floating potential. When driving voltage in lieu of current, the mean voltage signal can be adjusted until the mean current is zero. The mean voltage at zero mean current is then taken as the floating potential.

One non-limiting exemplary method for measuring slope is by calculation, using two points in the linear regime. For accuracy, it may be desirable that the two points be as different in value as possible while remaining in the system's linear regime. Operation in the linear regime can be reasonably ensured if the two measurements are made near the floating potential.

One non-limiting exemplary method for measuring floating potential and slope simultaneously is to apply an oscillating signal of some definite amplitude, such that the average current is zero. The average voltage will be the floating potential, and the ratio of the signal amplitudes will be the slope.

Figure 5:
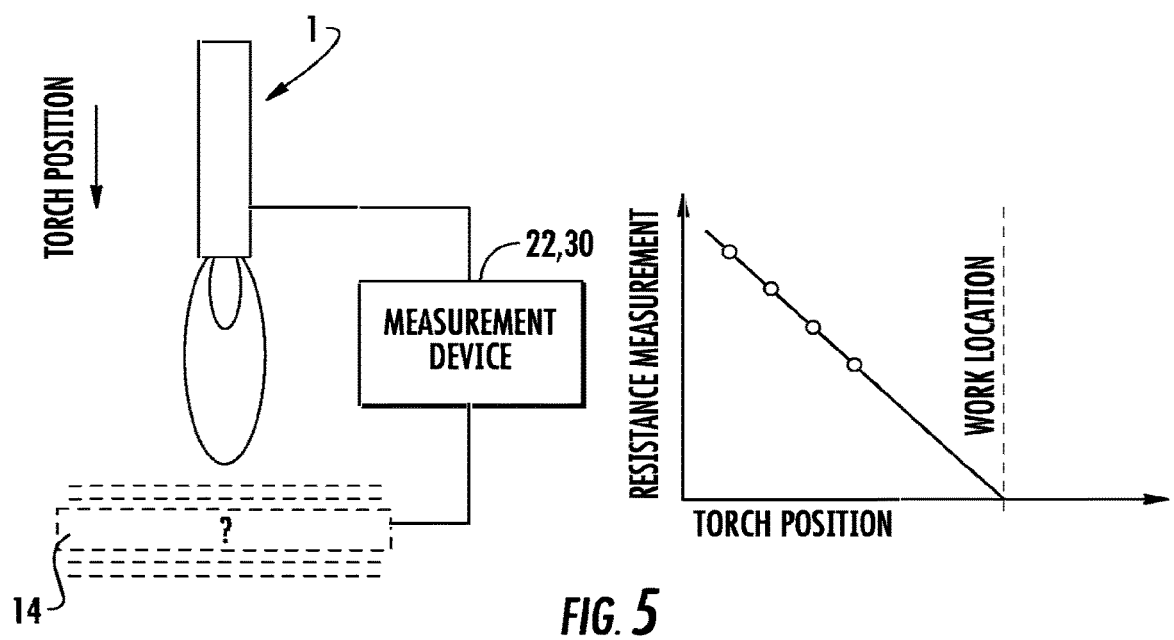
FIG. 5 is a schematic illustrating an exemplary technique for locating the surface of a work piece using the disclosed system.

As previously noted, the standoff height separating the torch 1 from the work piece 14 can be an important parameter in controlling an oxy-fuel cutting process. Prior to the preheat process, the exact location of the work piece surface may not necessarily known. One non-limiting exemplary embodiment that enables the location of the work piece surface to be determined, and a specific height to be maintained, is shown in FIG. 5. The torch 1 and the work piece 14 may constitute the two surfaces under test, (i.e., as shown in FIGS. 4A and 4B), eliminating the need for additional probes or sensors. It will be appreciated that any of a variety of surfaces of the torch 1 may be used as one of the surfaces under test, including the torch nozzle. A dedicated probe mounting surface (not shown) could also be mounted near the nozzle. In addition, a surface other than the work piece 14 could constitute the other surface under test. For example, any electrically conductive component positioned near the flame 16 could be used. In the illustrated embodiment, the torch 1 can be moved toward the work piece 14 in small predetermined increments. At each increment, a slope measurement can be recorded using the system 22, 30 of FIG. 4A or 4B. In one embodiment these compiled slope values are stored in memory (not shown) associated with the processor 28, 36. For example, the compiled slope values may be stored in a look up table in the memory.

In the aggregate, and as shown in FIG. 5, these measurements can form a trend tending to zero resistance for some position of the torch 1 with respect to the work piece 14. That extrapolated location may represent the position of the torch 1 where the tip of the nozzle 8 is touching the work piece 14. During operation of the system (e.g., preheating or cutting), when a particular flame resistance measurement is encountered, that value can be used to determine the position of the work piece 14, or more particularly it can be correlated to a specific standoff distance "SD" (FIG. 1) between the torch 1 and the work piece 14. This can be performed using a lookup table, or a predetermined standard value could be used. The system may make this determination continuously or periodically during cutting operations to confirm a desired standoff distance "SD" is maintained. In other embodiments, a pre-existing compilation of expected values for reference slope may be stored for given conditions.

Adjustments in standoff distance "SD" can be made during a cut to compensate for curvature in the work piece 14 and/or to compensate for differences in level between the work piece surface and the cutting machine path. When cutting is initiated, the standoff distance "SD" between the torch 1 and the work piece 14 can be "trusted." As such, a slope determination (using one of the previously described techniques) at the beginning of a cut can establish a reference value. After that, as the cut progresses, subsequent periodic slope determinations (again, using one of the previously described techniques) can be compared with the reference value and used to generate an error signal and/or an alarm condition if the determined slope departs from the reference value by a predetermined amount. In this way, the slope determination can act as a continuous measurement of errors in height.

The disclosed system and method can also be used to assess the gas mixture of the associated torch 1. As the gas mixture is adjusted, a variety of techniques may be used to assess its appropriateness for cutting. In some embodiments the flow of oxygen and fuel can be actively adjusted to maximize the heat flux into the work piece 14.

In one exemplary embodiment, the torch 1 can brought into position above the work piece 14, and the gas mixture can be adjusted while performing slope determinations in the manner previously described. With this method, the torch 1 and the work piece 14 are the surfaces under test (i.e., as shown in FIGS. 4A and 4B). The mixture at which the slope is extreme (i.e., a minimum or maximum value) can be used as the point at which the flame temperature is highest (since the most desirable condition may be the condition in which heat flux into the work piece 14 is at a maximum).

In an alternative embodiment, illustrated in FIG. 6, two identical probes 38, 40 may be placed symmetrically in the torch flame 16 at a height in the flame similar to where a work piece would be positioned during operation. In one embodiment, the probes 38, 40 may be a pair of tungsten rods extending into the torch flame 16 from either side. Alternatively the probes 38, 40 could be a pair of air or water cooled copper or stainless steel tube members. In one non-limiting exemplary embodiment the probes may be built into the torch 1. Due to the symmetrical nature of the test, the floating potential between the probes 38, 40 is very small, making the measurement simpler. The gas mixture at which the slope is extreme can be used as an approximation for the point at which the flame temperature is highest. In this embodiment, it is desirable that the measurement be performed at a location in the torch flame 16 that is representative of where the work piece 14 will ultimately be positioned. It will be appreciated that changes in gas mixtures and flow rates can make the flame grow and shrink drastically. As such, changes that actually cool the flame can register more extreme slopes if the hottest part of the flame has moved to the proximity of the probes.

Measured and/or calculated values of slope measurement and fuel-oxygen mixture can be used by the processor 28, 36 to determine an optimum fuel-oxygen mixture setting, as shown in the graph of FIG. 6.

The disclosed system and method can, in some embodiments, be used to measure the temperature of a work piece 14. Thus, the torch nozzle 8 and the work piece 14 may be used as the measurement surfaces (i.e., surfaces 1, 14 shown in FIGS. 4A and 4B). During preheating of the work piece 14, the nozzle 8 on the torch 1 is already at its steady state temperature. Meanwhile the temperature of the work piece will be rising. Since all other factors that influence the floating potential are held constant, the floating potential can be used as an indicator for the work piece temperature during preheat. In fact, as the work piece 14 heats up, the floating potential can actually be observed to stabilize for a brief period as the work piece surface becomes molten. When the floating potential crosses a certain threshold appropriate to the material, the nozzle, and the gas composition, cutting can begin. In some embodiments the threshold value or values (kindling temperature, floating potential) will be predetermined and stored in memory.

It has been established how the disclosed system and method may be used to monitor the standoff distance "SD" between the torch 1 and work piece 14 during a cutting process. In some embodiments the system and method can, in addition or alternatively, be used to diagnose the "health" of the cutting process. As the material in the cutting oxygen stream cools, the floating potential will decline. If the floating potential drops below a threshold appropriate to the nozzle, gas composition and flow rate, it can be used as an indicator that the cutting process is proceeding too fast, and should be slowed in order to maintain appropriate cutting parameters. In some embodiments the threshold value or values (kindling temperature, floating potential) will be predetermined and stored in memory.

Some embodiments of the disclosed system and method may be used to detect cutting flame ignition. When lighting a torch flame, regardless of the ignition process, it is not always clear whether a stable flame has been struck. A spark may have failed to be struck, or the flame may have blown off of the tip, or any number of other problems may prevent a first attempt from yielding a stable flame. As a result, it is desirable to check that ignition was successful. With the disclosed system and method, any two conductive surfaces in the vicinity of where a stable flame should be can be monitored. Failure to detect conduction in the presence of a potential substantially higher than a reasonable floating potential (e.g., 10 V) indicates that ignition has failed. In one embodiment the two conductive surfaces could be the torch 1 and the work piece 14.

Figure 7A:
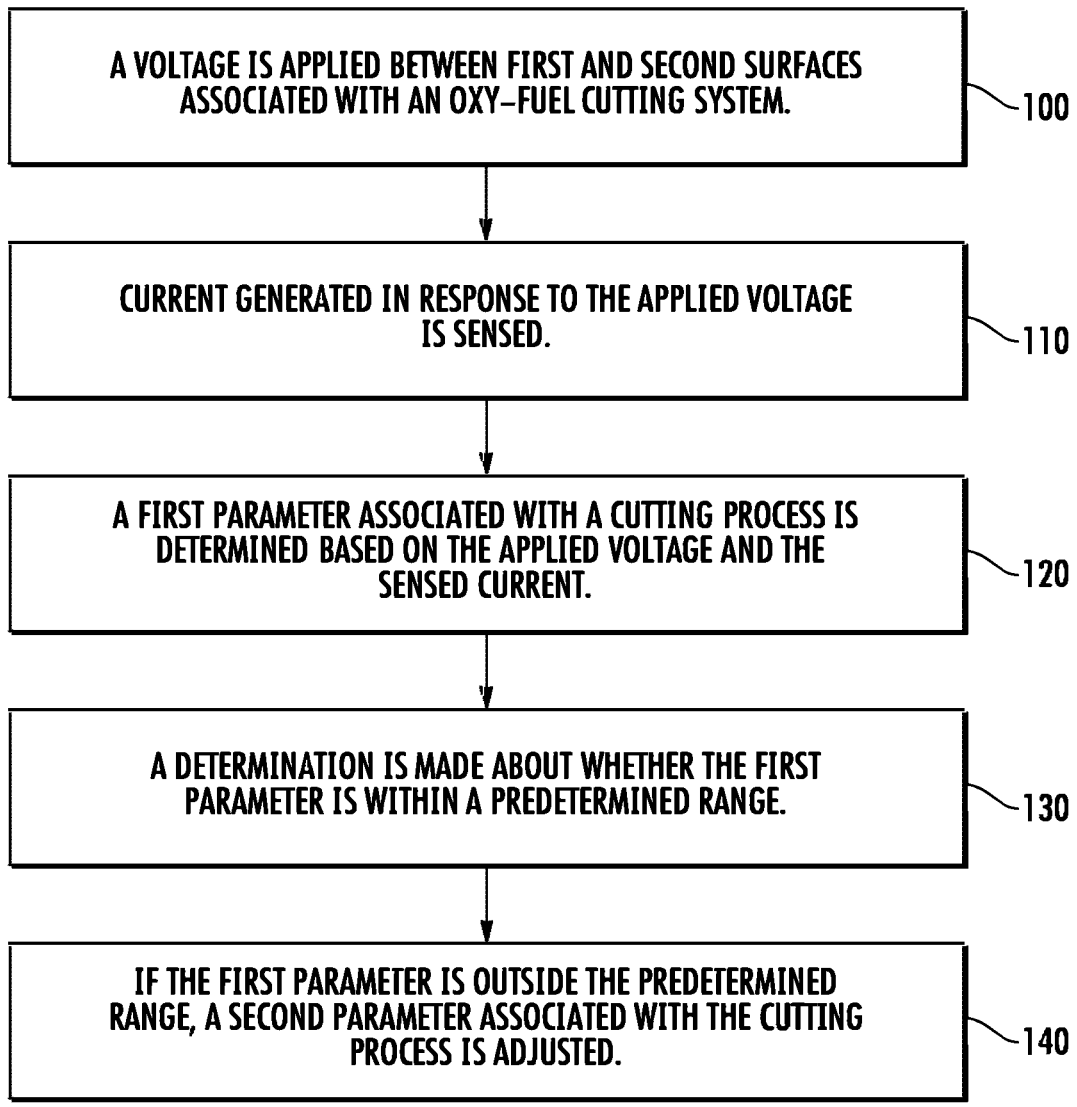
FIGS. 7A and 7B are flow diagrams illustrating exemplary methods in accordance with the disclosure.

FIG. 7A is a flow diagram illustrating an exemplary method according to the disclosure. At step 100, a voltage is applied between first and second surfaces associated with an oxy-fuel cutting system. In some embodiments the first and second surfaces are a torch surface and a work piece, respectively. The first and second surfaces may be exposed to the flame of an oxy-fuel torch during operation. At step 110, a current generated in response to the applied voltage is sensed. At step 120, a first parameter associated with a cutting process is determined based on the applied voltage and the sensed current. At step 130, a determination is made about whether the first parameter is within a predetermined range. At step 140, if it is determined that the first parameter is outside the predetermined range, a second parameter associated with the cutting process is adjusted.

Figure 7B:
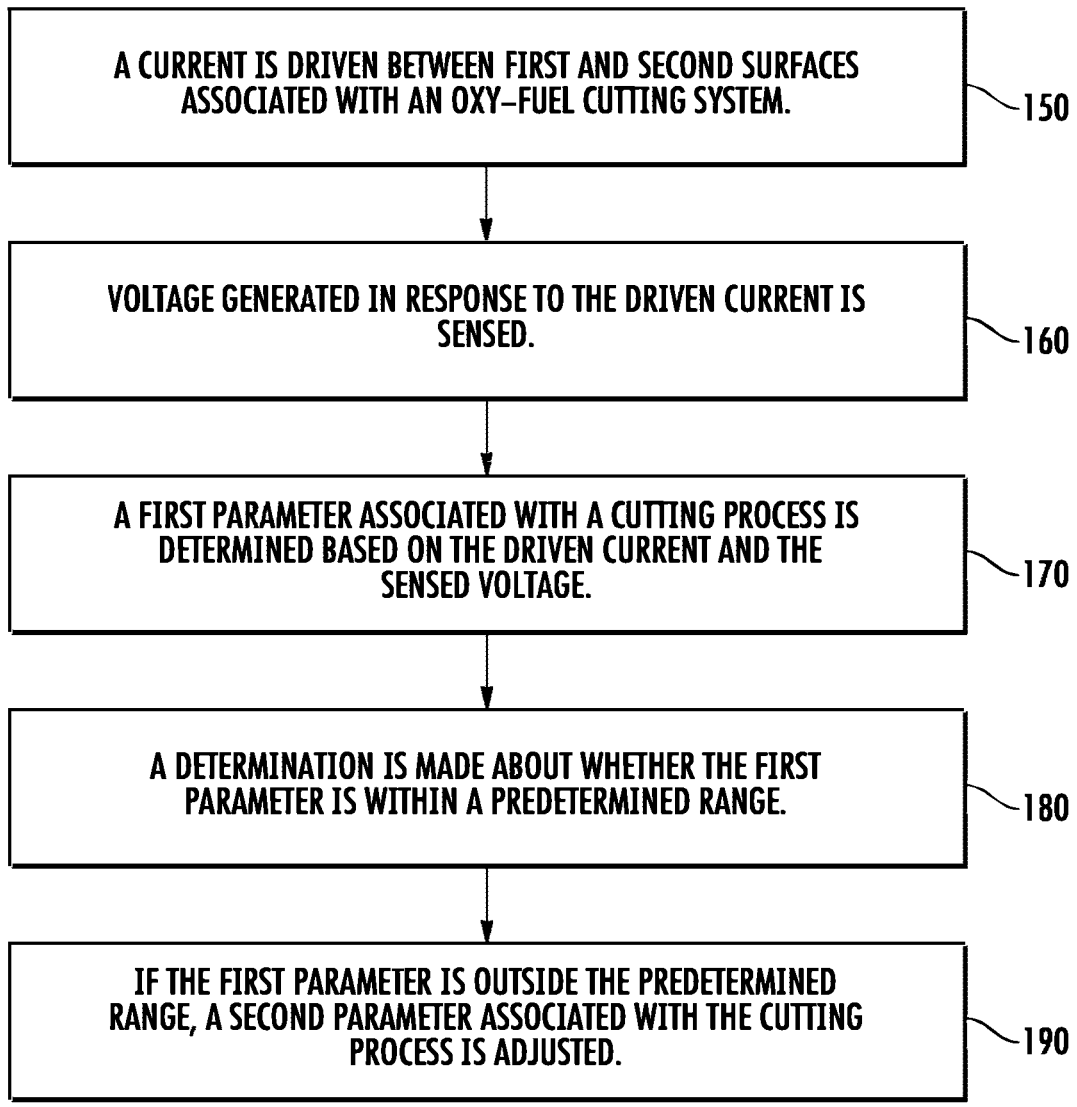

FIG. 7B is a flow diagram illustrating an exemplary method according to the disclosure. At step 150, a current is driven between first and second surfaces associated with an oxy-fuel cutting system. In some embodiments the first and second surfaces are a torch surface and a work piece, respectively. The first and second surfaces may be exposed to the flame of an oxy-fuel torch during operation. At step 160, a voltage generated in response to the driven current is sensed. At step 170, a first parameter associated with a cutting process is determined based on the driven current and the sensed voltage. At step 180, a determination is made about whether the first parameter is within a predetermined range. At step 190, if it is determined that the first parameter is outside the predetermined range, a second parameter associated with the cutting process is adjusted.

Figure 8:
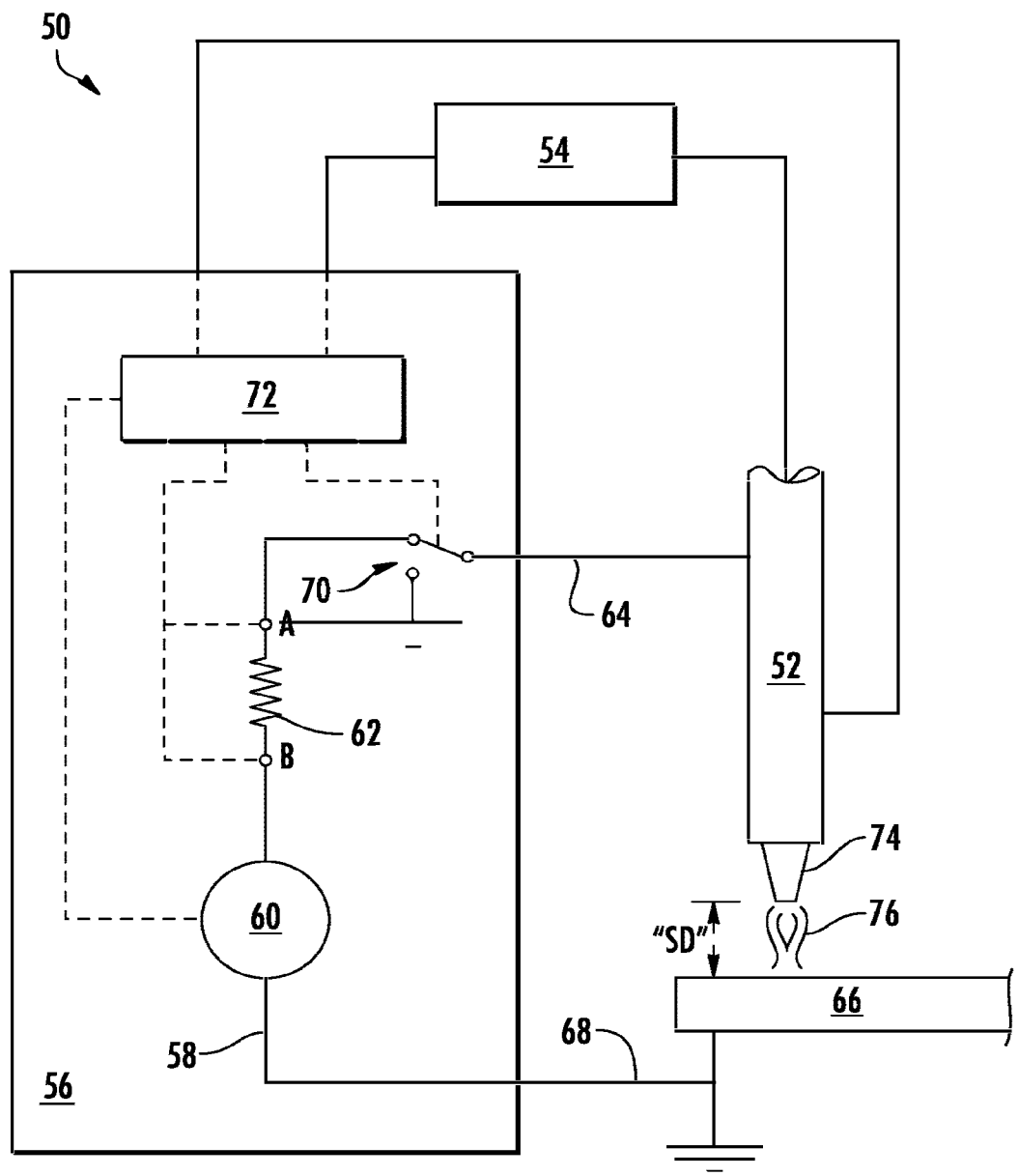
FIG. 8 is a schematic view of an exemplary automated cutting system in accordance with the present disclosure.

Referring now to FIG. 8 shows a non-limiting exemplary automated oxy-fuel cutting torch system 50 (hereinafter "cutting system 50") in accordance with the present disclosure. The torch system 50 may include a gas cutting torch 52 (hereinafter "the torch 52") that is operatively mounted to a computer numerical control (CNC) machine 54 or other automated machine tool that is capable of moving the torch 52 along a predefined path, such as may be specified in a software file. The torch 52 is shown generically connected to the CNC machine 14, but it will be appreciated that in practical application the torch 52 will be mounted to the CNC machine 54 in a manner that facilitates 2-dimensional or 3-dimensional movement of the torch 52 as further described below. The torch 52 may be any type of gas cutting torch, including, but not limited to, an oxy-fuel torch, a propane torch, a propylene torch, a butane torch, or a mixed-fuel torch.

The cutting system 50 may also include a controller 56, which in one embodiment comprises a microprocessor. The controller 56 may include a circuit 58 including an electrical power source 60 connected electrically in series with a resistor 62 or other current or voltage measurement device. The power source 60 may be a voltage source or a current source. For the sake of convenience, the following description of the cutting system 50 and the accompanying method shall assume that the power source 60 is a voltage source, in which case a current may be induced and measured in the circuit 58 as further described below. However, it will be understood that the power source 60 may alternatively be a current source, in which case a voltage may be induced and measured between the torch 52 and a work piece 66 (described below).

Figure 10:
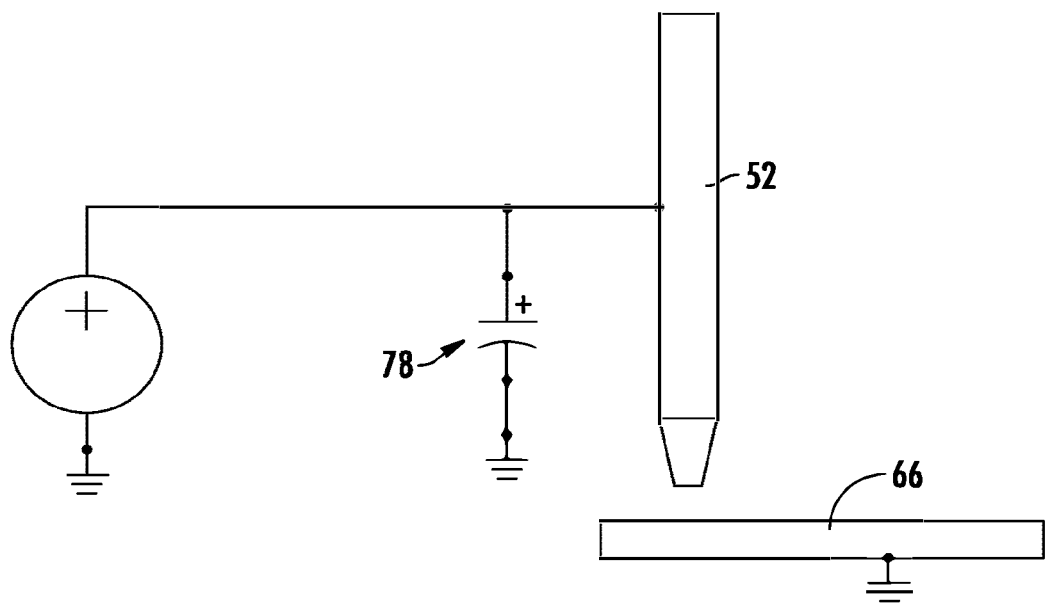
FIG. 10 is a schematic view illustrating an exemplary capacitive energy storage device of the present disclosure.
Figure 11:
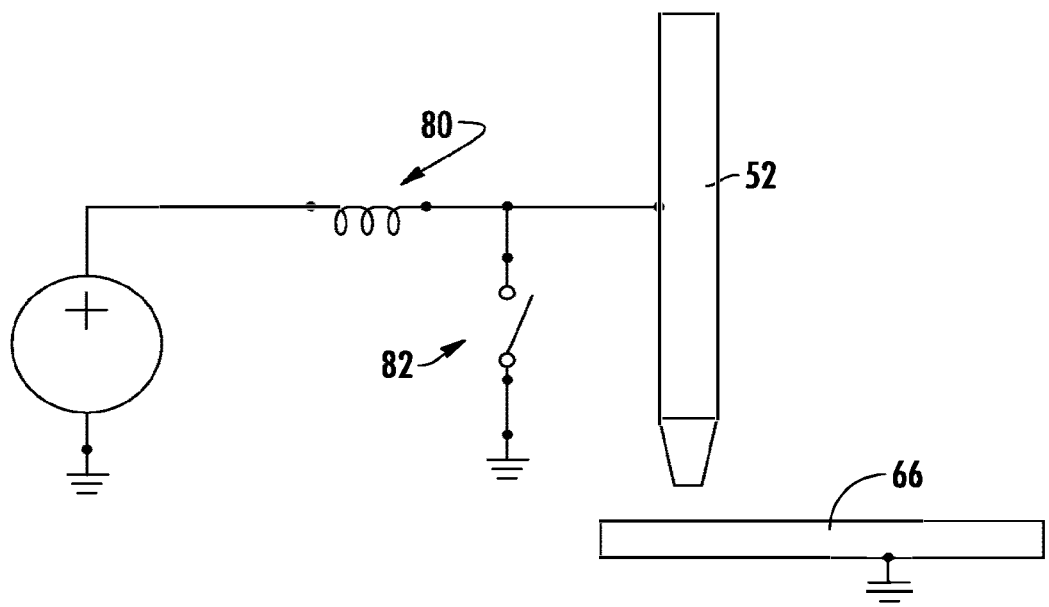
FIG. 11 is a schematic view illustrating an exemplary inductive energy storage device of the present disclosure.
Figure 12:
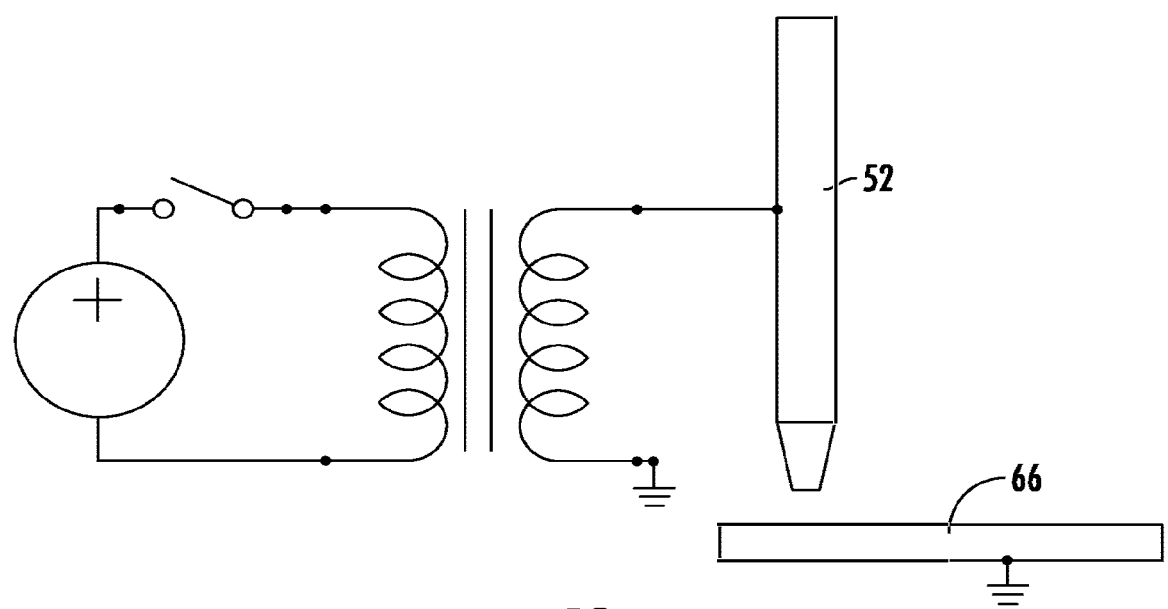
FIG. 12 is a schematic view illustrating an exemplary oscillating voltage source of the present disclosure.

During operation of the cutting system 50, one side of the circuit 58 may be electrically connected to the torch 52, such as by a first conductor 64, and the other side of the circuit 58 may be electrically connected to a work piece 66 that is to be cut by the torch 52, such as by a second conductor 68. The circuit 58 may further include a switch 70 for connecting the torch 52 to ground when the cutting system 50 it is not in operation, thereby preventing the buildup of static electricity in the circuit 58. The circuit 58 may include additional switches (as shown in FIGS. 10-12) for placing the torch in and out of electrical communication with circuits for ignition as further described below.

The controller 56 may further include a processor 72 that is capable of executing a number of predefined instructions. The processor 72 may be operatively connected to the power source 60 for regulating an amount of voltage output therefrom as further described below, and may also be electrically coupled the circuit 58, such as at points A and B, for measuring an amount of current flowing in the circuit 58. The processor 72 may further be operatively connected to the CNC machine 54 and to the torch 52 for controlling/ modifying the operation thereof as described in greater detail below. The processor 72 may further be operatively connected to the switch 70 for controlling the operation thereof, such as for selectively moving switch between a closed position, wherein the torch 52 is connected to the circuit 58 (e.g. when the cutting system 50 is in use), and an open position, wherein the torch 52 is connected to ground (e.g. when the cutting system 50 is not in use). A non-volatile memory (not shown) may be associated with the processor 72 for storing software instructions executed by the processor 72 and/or for storing data collected from the circuit 58.

Figure 9:
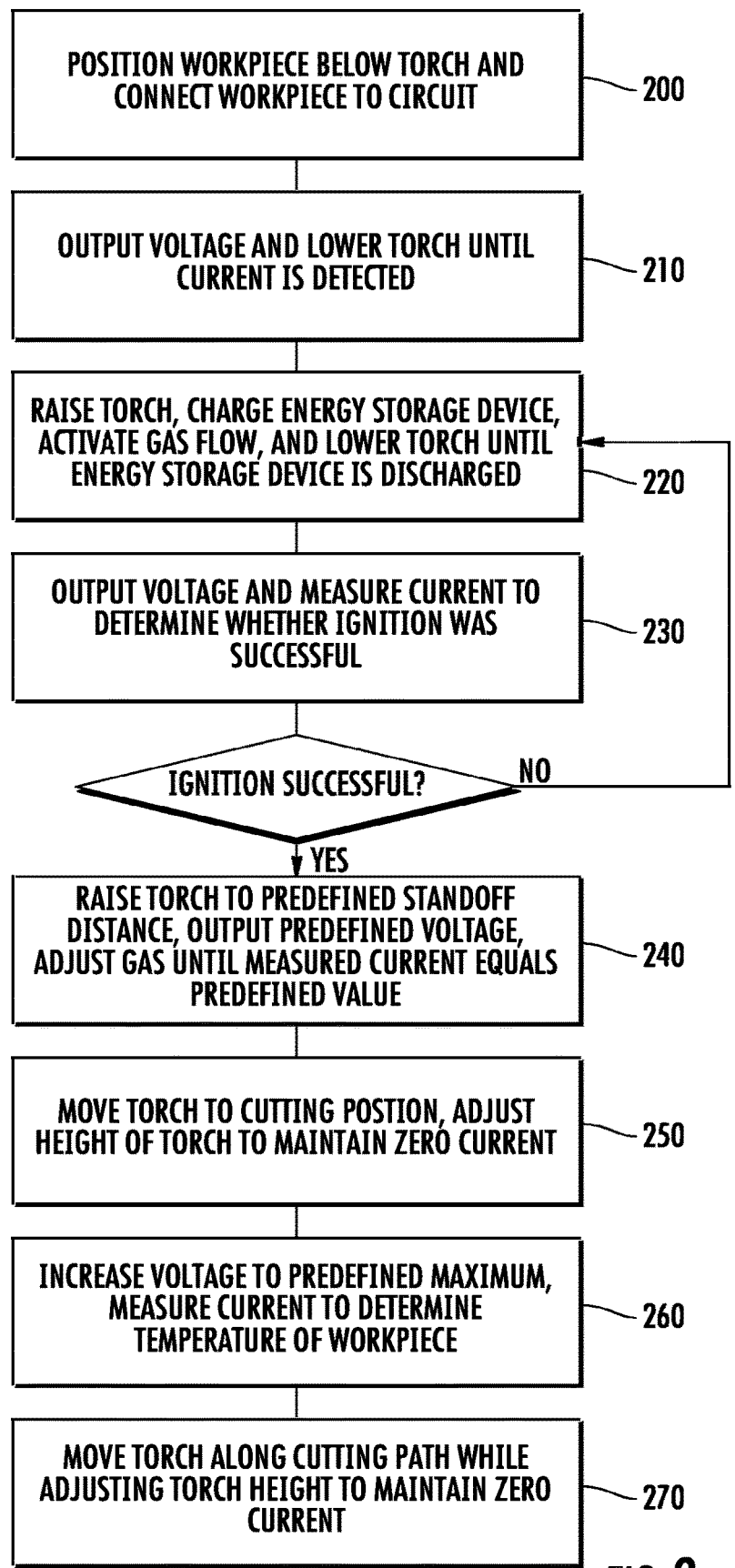
FIG. 9 is flow diagram illustrating an exemplary method for operating the automated gas cutting system of the present disclosure.

Referring to FIG. 9, a flow diagram illustrating an exemplary method of operating the cutting system 50 in accordance with the present disclosure is shown. Generally, the method exploits the electrically conductive nature of the torch's flame to determine the state of the work piece 66 being cut before and during cutting. Particularly, the high-temperature gases present in the torch's flame are sufficiently dissociated so that if a voltage is applied between the torch 52 and the work piece 66 a current will flow through the flame. This principle will be described in greater detail below in the context of the exemplary method.

At a first step 200 of the exemplary method, the work piece 66 may be manually or automatically positioned below the unlit torch 52 and connected to the circuit 58, such as by the conductor 68. For example, the conductor 68 may be connected to the work piece through the table, such as by an alligator clip or some similar means of electrically conductive attachment. The nozzle 74 of the torch may initially be disposed well above the surface of the work piece 66, such as at a standoff distance "SD" of 6-12 inches, for example. If the switch 70 is in the open position, the processor 72 may direct the switch to move to the closed position, thereby placing the torch in electrical communication with the circuit 58.

At step 210 of the method, the processor 72 may command the power source 60 to output a relatively low voltage, a non-limiting example of which is 12V. The processor 72 may then command the CNC machine 54 to slowly lower the unlit torch 52 until the processor 72 detects current flowing in the circuit 58 between connection points "A" and "B", indicating that the nozzle 74 of the torch 52 has been brought into contact with the work piece 66 to complete the circuit 58. The processor 72 may then record the height of the torch 52 in this position as a "zero height" (i.e. the height of the upper surface of the work piece 66). This height may be stored in volatile or non-volatile memory associated with the processor.

At step 220 of the method, the processor may command the CNC machine 54 to elevate the torch 52 away from the work piece 66. The processor 72 may simultaneously direct the power source 60 to charge an energy storage device (described below) that is electrically connected within the circuit 58. For example, referring to FIG. 10, the energy storage device may be a capacitor bank 78, in which case one or more capacitors in electrical communication with the torch 52 and some other surface (e.g. the work piece 66) may be charged in advance to a predetermined voltage and discharged when the CNC machine 54 moves the torch 52 into contact with said surface. Alternatively, referring to FIG. 11, the energy storage device may be an inductor 80 that is in electrical communication with the torch 52, in which case a switch 82 may be closed to induce a current in an inductor 80, wherein the energy stored in the inductor 80 is discharged once the torch 52 is moved into the proximity of the work piece 66 or other surface and the switch 82 is opened.

In either case (i.e. either a capacitive or inductive energy storage device), if the processor 72 has commanded activation of a flow of gas from the torch 52 (e.g. by actuation of appropriate solenoid valves), and has properly positioned the torch 52 in advance, then the above-described discharge of electrical energy may create an ignition site in the gap between the torch 52 and the work piece 66 or other surface, thereby igniting the stream of gas flowing therethrough. This process may be enhanced by imposing some combination of oscillating voltages or high voltages to increase the gap distances over which ignition can occur, as shown in FIG. 12.

At step 230 of the method, the processor 72 may detect successful ignition of the gas by directing the voltage source to output a relatively low voltage, a non-limiting example of which is 24V, after discharge of the capacitors. If the fuel gas was successfully ignited by the discharge, a small current will flow through the flame 76 and will be detected by the processor 72 between points "A" and "B" in the circuit 58. If, by contrast, ignition was not successful, there will be no flame 76 and therefore no detectable current in the circuit 58. In the case of ignition failure, the processor 72 may repeat the entire ignition process (i.e. step 220 of the method) until successful ignition is detected.

At step 240 of the method, the processor 72 may direct the CNC machine 54 to raise the torch 52 until the nozzle 74 reaches a predefined standoff distance "SD" relative to the known zero height (i.e. the surface of the work piece 66). The processor 72 may then direct the power source 60 to output a low voltage, a non-limiting example of which is 12V. At such a low voltage, the current in the circuit 58 will be determined by the resistance of the path between the torch 52 and the work piece 66 or some other surface. Such resistance is highly sensitive to variations in the quality of the flame 76. Thus, the gas mixture in the torch 52 (e.g. the ratio of fuel gas to oxygen) may be adjusted until a desired current value in circuit 58, as determined by the processor 72, is achieved at the predefined standoff distance "SD", where this desired current value is indicative of a desired quality of flame 76. In one non-limiting exemplary embodiment, the desired current value may be indicative of a flame 76 that is suited for preheating the work piece 66 prior to cutting.

At step 250 of the method, the processor 72 may command the CNC machine 54 to move the torch 52 to a designated location along the surface of the work piece 66 where cutting is to begin. The processor 72 may then adjust the voltage in the circuit 58 to maintain a constant current, such as may be achieved by directing the CNC machine 54 to adjust the standoff distance "SD." That is, when the standoff distance "SD" is increased, the voltage in the circuit 58 increases and the current in the circuit 58 decreases. Conversely, when the standoff distance "SD" is decreased, the voltage in the circuit 58 decreases and the current in the circuit 58 increases. The processor 72 may in this way utilize the measured current in the circuit 58 to maintain a consistent standoff distance "SD" relative to the work piece regardless of variations in the surface of the work piece 66. This principle is described in U.S. Pat. Nos. 4,328,049 and 3,823,928, the disclosures of which are incorporated herein by reference.

At step 260 of the method, the processor 72 may command the power source 60 to increase its output voltage to a predefined maximum value at which the current in the circuit 58 is guaranteed to be limited by electron evaporation from the work piece 66. This predefined maximum value may be determined from the geometry and flow rate of the torch 52, for example. Such parameters may be known in advance, and an operator may consult a schedule of voltages or currents that are known to be important. Other embodiments of the present method may include looking for current-voltage sensitivities (i.e. the relationship between a change in current relative to a change in voltage).

With the voltage set at the predefined maximum value, the current in the circuit 58 will increase coherently with the temperature of the work piece 66. It will be appreciated by those of skill in the art that when a material, particularly metal, is sufficiently heated, the increased kinetic energy exhibited by the electrons of the material may allow the electrons to momentarily escape from the material's boundaries. If an anode that is charged with a sufficiently large voltage is placed in the vicinity of the material, the electrons that escape from the material will be pulled away by the charged anode at exactly the same rate at which they evaporate from the material. This rate of evaporation is known to be a function of the temperature of the material.

The current in the circuit 58, as affected by the above-described electron evaporation from the work piece 66 and as detected by the processor 72, may be used to reliably determine the temperature of the work piece 66. When the measured current reaches a predefined level, such as a level indicative of a kindling temperature in the work piece 66, preheating of the work piece 66 is complete and cutting can begin. As will be appreciated by those of ordinary skill in the art, cutting the preheated work piece 66 may be achieved by activating the flow of cutting oxygen.

At step 270 of the method, the CNC machine 54 may move the torch 52 along the work piece 66 in accordance with a predefined cutting path at an appropriate speed for maintaining the quality of the cut. As the cut is made, the desired standoff distance "SD" may be maintained by continuously performing the torch height adjustment as described in step 250 above.

It should be appreciated that certain steps of the above-described exemplary method may be hindered by inconsistencies and imperfections in the surfaces of work pieces being cut. For example, oxidation on the surface of a work piece may form a barrier that resists current flow for contact sensing (as described in step 210 above) and/or that resists electrical arcing for torch gas ignition (as described in step 220 above). U.S. Pat. No. 7,087,856, which is incorporated herein by reference, describes a method for detecting contact through oxidation layers on a work piece in a manner that is safe to humans (i.e. that does not involve the application of high voltage or high frequency energy for an appreciable amount of time). It is contemplated that such a method may be similarly implemented in the context of the present disclosure for contact sensing and/or for torch gas ignition.

Additionally, the effect of oxidation or surface irregularities may be compensated for by taking initial calibration measurements when the work piece is in a known condition. A non-limiting example of this would be positioning the ignited torch 52 above a plate known to be at or near ambient temperature, and applying sufficient voltage so as to drive a current limited by thermionic emission from the plate. This calibration current sensed at this condition is an indication of the plate condition. The kindling temperature can then be recognized by when the measured current increases by some pre-determined amount relative to the calibration current.

In view of the forgoing, it will be appreciated that the cutting system 50 and accompanying method of the present disclosure provide a number of important advantages relative to existing automated cutting torch systems. Particularly, the system and method facilitate features such as automatic standoff control, automatic ignition, ignition detection, flame quality detection, and kindling temperature detection without requiring many of the moving parts, on-board electronics, and sensors associated with existing torch systems. The cutting system 50 of the present disclosure is therefore far more economical, reliable, and robust than existing systems.

It will be appreciated that although the foregoing description related to the specific implementation of the disclosed system and method in relation to an oxy-fuel cutting apparatus, that the disclosed system and method can be implemented in any of a variety of oxy-fuel thermal processing apparatus. In one non-limiting example, the disclosed system and method can be implemented in an oxy-fuel welding apparatus.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Some embodiments of the disclosed device may be implemented, for example, using a storage medium, a computer-readable medium or an article of manufacture which may store an instruction or a set of instructions that, if executed by a machine, may cause the machine to perform a method and/or operations in accordance with embodiments of the disclosure. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory (including non-transitory memory), removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof. Although specific terms are employed herein, they are used in a generic and descriptive sense only and not for the purpose of limitation.

The invention claimed is:

1. A method for controlling oxy-fuel thermal processing equipment, comprising:
    applying a voltage between a first surface and a second surface while the first surface and the second surface are exposed to a flame of a torch generated by the oxy-fuel processing equipment, wherein the second surface is part of a workpiece;
    sensing a current flowing between the first surface and the second surface and through the flame of the torch, and generated in response to the applied voltage, to obtain a sensed current, wherein the applied voltage is selected such that the sensed current is limited by electron evaporation from the workpiece;
    determining a temperature of the second surface based on the applied voltage and the sensed current;
    determining whether the temperature of the second surface corresponds to a kindling temperature of the workpiece; and
    in response to the temperature of the second surface corresponding to the kindling temperature of the workpiece adjusting a gas mixture that is being fed to the torch.

2. The method of claim 1, wherein the first surface and the second surface and the flame are part of an electrical circuit, which, when operated, is represented by an I-V characteristic curve, the method further comprising applying a value of voltage that ensures operation of the electrical circuit within a linear regime of the I-V characteristic curve.

3. The method of claim 1, wherein determining the first parameter includes determining a slope of a characteristic curve of the circuit, and determining the slope comprises obtaining two discrete values of applied voltage and sensed current, and obtaining a ratio of respective changes of each, wherein the ratio comprises the slope.

4. The method of claim 1, further comprising:
    determining a first parameter: associated with a thermal process of the thermal processing equipment based on the applied voltage and the sensed current by:
    obtaining a plurality of values of applied voltage and sensed current, associating the plurality of values into applied voltage and sensed current response pairs; and
    performing a linear curve fit of the pairs to determine a slope of a characteristic curve of a circuit that includes the first surface, the second surface and the flame.

5. The method of claim 1, further comprising determining a distance between the first surface and the second surface by calculating, based on the applied voltage and the sensed current, a slope of a characteristic curve in a linear regime.

6. The method of claim 1, further comprising connecting the torch to ground when the flame of the torch is extinguished.

7. The method of claim 1, further comprising moving the torch along a cutting path.

8. The method of claim 7, further comprising adjusting a distance between the torch and the workpiece while moving the torch along the cutting path.

9. The method of claim 1, further comprising, based on the applied voltage and the sensed current, determining whether ignition of the torch has occurred.

* * * * *